Dec. 10, 1963 J. E. TAUNT 3,114,115

SINGLE TRANSISTOR MAGNETIC MULTIVIBRATOR AMPLIFIER

Filed June 22, 1959

INVENTOR
JAMES E. TAUNT
BY Francis V. Giolma
ATTORNEY

United States Patent Office 3,114,115
Patented Dec. 10, 1963

3,114,115
SINGLE TRANSISTOR MAGNETIC MULTIVIBRATOR AMPLIFIER

James E. Taunt, Endwell, N.Y., assignor to International Business Machines Corporation, New York, N.Y., a corporation of New York Filed June 22, 1959, Ser. No. 821,794
4 Claims. (Cl. 331—113)

This invention relates generally to magnetic multivibrators, and it has reference in particular to current limiting means for magnetic multivibrator amplifiers.

Generally stated, it is an object of this invention to provide an improved magnetic multivibrator amplifier.

More specifically, it is an object to the present invention to reduce the losses in an amplifier of the magnetic multivibrator type.

One of the objects of this invention is to provide for using a saturable magnetic core to reduce current spikes in a magnetic multivibrator amplifier.

Yet another object of this invention is to provide for using a biased, magnetic core reactor in the emitter circuit of a transistor switch in a magnetic multivibrator so as to back-bias the transistor to shut it off.

It is also an important object of this invention to provide for using a saturable core reaction in circuit with a transistor and for normally biasing the core so that the reactor does not become effective until the transistor current increases beyond a predetermined value.

It is also an object of this invention to provide for using a substantially square hysteresis loop material saturable core reactor in circuit with a transistor in a magnetic multivibrator, and for biasing the core so that it is ineffective for a normal value of transistor current.

The foregoing and other objects, features and advantages of the invention will be apparent from the following more particular description of a preferred embodiment of the invention, as illustrated in the accompanying drawings.

Figure 1:
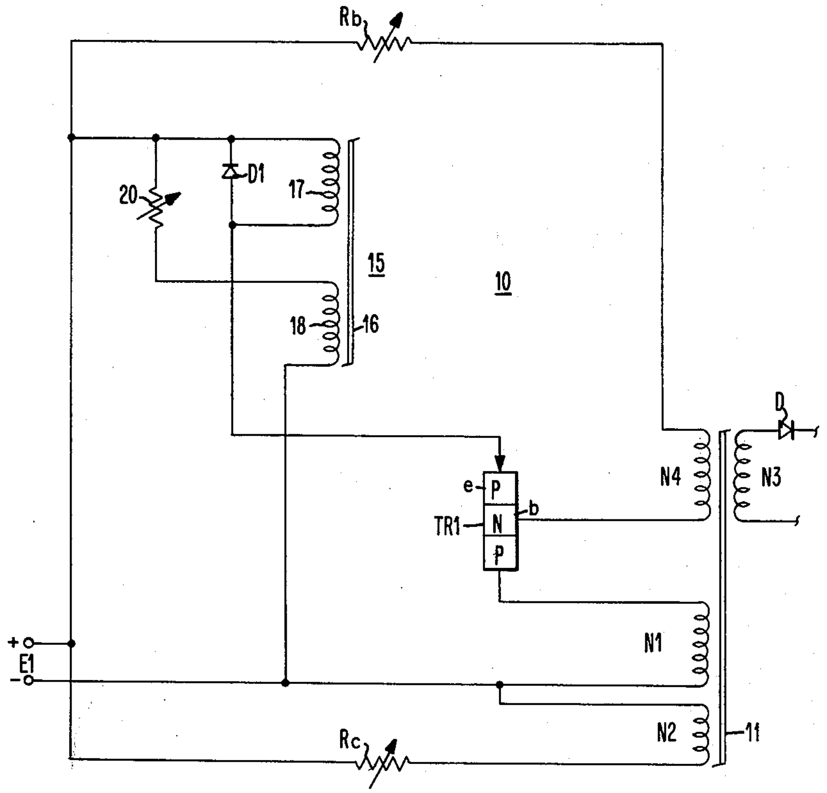
FIG. 1 is a schematic diagram of a magnetic multivibrator amplifier embodying the principles of the invention in one of its forms.

Referring particularly to FIG. 1 of the drawing, the reference numeral 10 designates a magnetic multivibrator amplifier having a magnetic core member 11 of a substantially rectangular hysteresis loop material, such as Orthonol or Deltamax, comprising on the order of 50 percent nickel and 50 percent iron and which may have a toroidal form. The core 11 is provided with a plurality of windings including input winding N1, a reset winding N2, an output winding N3, and a base control winding N4.

The magnetic multivibrator amplifier 10 may be generally of the type disclosed in the copending application, Serial No. 734,976 of Ayhan Hakimoglu entitled Magnetic Multivibrator Amplifier, which was filed on May 13, 1958, now Patent No. 3,034,072, and is assigned to the assignee of the present application. As set forth in the Hakimoglu application, the input winding N1 is connected by means of a transistor TR1 to a suitable source of direct current voltage, such as a battery or the like, designated by the reference E1, so as to provide a substantially constant voltage drive for effecting positive saturation of the core 11. The reset winding N2 is connected to a suitable source of direct current, such as a battery or the like, and which may comprise either a separate source or, as shown, the same source E1 for driving the core to saturation in the opposite sense for the purpose of resetting flux in the core. The reset winding N2 is connected to the source by means of a relatively high value impedance device, such as a resistor Rc, so as to determine the operating characteristics thereof and provide a substantially constant current reset drive, which greatly facilitates impedance control of the resetting time. The output winding N3 is connected through any suitable circuit means, which may include means, such as a diode D, for developing a positive output voltage for application to a load circuit. The base control winding N4 is connected in circuit with the base electrode *b* and the emitter *e* of the transistor TR1 for effecting positive feedback and driving the transistor to saturation through a voltage induced in the winding N4 during saturating of the core 11. An adjustable control resistance R*b* is connected in circuit with the winding N4 for varying the base current in the circuit, so as to determine the maximum output current of the output winding N3.

Figure 2:
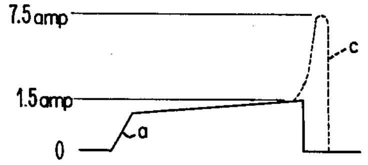
FIG. 2 shows typical output curves for a magnetic multivibrator amplifier, both with and without the improvement of the present invention.

While a multivibrator, such as hereinbefore described in connection with FIG. 1, is found to be free-running and to have a substantially rectangular output voltage characteristic, it will be found that the transistor current has a characteristic such as represented by the initial solid portion of the curve *a* but terminating in a spike represented by the dotted line portion of the curve *c* as shown in FIG. 2. An analysis of the heating of the transistor indicates that a large percentage of the heating in the transistor occurs in the final current spike. Increasing the frequency of operation of a transistor in such a magnetic multivibrator increases the number of these spikes and thus increases the heating and losses in the transistor, which in turn limits the frequency at which the transistor is able to operate satisfactorily.

In order to eliminate these characteristic spikes, a saturable reactor 15 is provided having a core of substantially rectangular hysteresis loop material with operating and bias windings 17 and 18 thereon. The operating winding 17 is connected in series with the emitter *e* of the transistor, and the bias winding 18 is connected through an adjustable resistor 20 to the source E1, so as to provide a biasing force for opposing the saturating effect on the magnetic core 16 by the current through the winding 17 until the current in the winding 17 exceeds a predetermined value, which in the present instance may be set at 1½ amperes, which is the approximate value of the principal portion of the curve *a*. A diode D1 is connected across the operating winding 17 to prevent the voltage induced in the winding 17 on reset of the flux in the core from triggering the transistor.

With the core 16 biased off by means of current through the bias winding 18, it will be saturated in the negative sense, for example, and will have no effect on the circuit until the current in the winding 17 exceeds the 1½ amperes value. When the current in the winding 17 exceeds 1½ amperes, this overcomes the affect of bias winding 18, and the core 16 moves out of the saturated region and a voltage is thereupon developed across the winding 17, which is in a direction to back-bias the transistor and cause it to shut off. Because of the voltage thus developed in the winding 17, the output characteristic of the transistor TR1 now follows the initial and final solid portions of the curve *a*, and the previous spike represented by the dotted portion of the curve *c* will be eliminated.

As typical of one example of a magnetic multivibrator amplifier, such a multivibrator has been operated successfully having a toroidal core wound from Orthonol tape of .002 thickness with a width of 1.11 inches and having an outside diameter of 2.1 inches and an inside diameter of 1.4 inches. The input winding N1 comprises 200 turns of No. 16 conductor and is connected to a 33 volt direct current source through a type 2N174 transistor TR1. The base control winding N4 comprises 50 turns of No. 22 conductor and is connected through a control resistor R*b* of 50 ohms. The reset winding N2 comprises 100 turns of No. 22 conductor and is connected to the 33 volt source through a 300 ohm resistor R*c*. The control reactor 15 comprises a core of Orthonol tape having a 1 inch outside diameter and a ¾ inch inside diameter with a cross-section of .227 square centimeters. The windings 17 and 18 each comprise 19 turns, and the diode D1 is of the type 1N92. With a current limiting core of the type described, the power dissipation is reduced to approximately one quarter of what it was without such core, and the turn-off time of transistor TR1 is reduced from fifteen microseconds to approximately eight microseconds.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a single transistor magnetic multivibrator, a magnetic core having a plurality of windings including output, saturating, and reset windings, a transistor switch connecting the saturating winding to a direct current source, impedance means connecting the reset winding directly to a direct current source to provide substantially constant current flux reset, and a substantially rectangular hysteresis loop auxiliary core having one winding connected in series with the transistor switch and another winding connected directly to a direct current source to prevent switching of the auxiliary core until the current in said one winding exceeds a predetermined normal maximum value.

2. A single transistor magnetic multivibrator comprising a magnetic core of a substantially rectangular hysteresis loop material having output, saturating, control, and reset windings thereon, a transistor connecting the saturating winding to a direct current source to provide a substantially constant voltage saturating drive, linear impedance means connecting the reset winding to a direct current source to provide substantially constant current reset, circuit means connecting the control winding to provide positive feedback control of the transistor, and a saturable reactor having a substantially rectangular hysteresis loop auxiliary core with one winding thereon connected to provide a back-biasing voltage for cutting the transistor off, and another winding connected directly to a direct current source to bias the auxiliary core against switching until the transistor current rises to a predetermined maximum value so that the reactor limits the current to said maximum value.

3. In a magnetic multivibrator, a magnetic core of substantially rectangular hysteresis loop material having a plurality of windings thereon, a PNP transistor connecting one of said windings to a direct current source to provide a substantially constant voltage saturating drive, circuit means connecting another one of said windings to provide positive feedback control of the transistor, a relatively high value resistance device connecting yet another one of said windings to a direct current source to provide substantially constant current reset of the core, and a current limiting reactor having a substantially rectangular hysteresis loop core with one winding connected in series with the transistor to provide a back-biasing voltage when the reactor core changes from one saturation state to another, and another winding connected to normally provide for biasing the core in said one state until the transistor current reaches a predetermined maximum value.

4. In a single switch means magnetic multivibrator, a magnetic core of substantially rectangular hysteresis loop material having a plurality of windings thereon, controllable switch means connecting one of the windings to a direct current source for saturating the core, circuit means connecting another one of said windings to effect feedback control of said switch means, impedance means connecting yet another one of said windings to a direct current source to provide a substantially constant current reset drive for the core, a saturable reactor having a core with a first winding connected in series with the switch means to provide a voltage in one direction for back-biasing said switch means when the flux in the core is changed in one direction, and a second winding normally connected to provide a reset bias to prevent the flux being changed in said one direction until the current in the first winding exceeds a predetermined maximum value, and unidirectional means connected for preventing a voltage output in the direction to forward-bias the switch means.

References Cited in the file of this patent

UNITED STATES PATENTS

| | | |
|---|---|---|
| 2,774,878 | Jensen | Dec. 18, 1956 |
| 2,826,731 | Paynter | Mar. 11, 1958 |
| 2,848,614 | Lyons | Aug. 19, 1958 |